(12) United States Patent
Vermunt

(10) Patent No.: US 10,878,204 B2
(45) Date of Patent: Dec. 29, 2020

(54) SYSTEM AND METHOD FOR VERIFYING WHETHER OBJECTS BELONG TO A PREDEFINED SET

(71) Applicant: NXP B.V., Eindhoven (NL)

(72) Inventor: Franciscus Maria Vermunt, Waalre (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/576,013

(22) Filed: Sep. 19, 2019

(65) Prior Publication Data

US 2020/0104547 A1   Apr. 2, 2020

(30) Foreign Application Priority Data

Oct. 1, 2018   (EP) .................................... 18197932

(51) Int. Cl.
| | | |
|---|---|---|
| G06K 7/00 | (2006.01) | |
| H04W 4/80 | (2018.01) | |
| G06K 7/10 | (2006.01) | |
| G06Q 10/08 | (2012.01) | |
| H04W 52/02 | (2009.01) | |

(52) U.S. Cl.
CPC ....... *G06K 7/0008* (2013.01); *G06K 7/10039* (2013.01); *G06K 7/10297* (2013.01); *G06Q 10/087* (2013.01); *H04W 4/80* (2018.02); *H04W 52/0277* (2013.01)

(58) Field of Classification Search
CPC ............. G06K 7/0008; G06K 7/10039; G06K 7/10297; G06K 7/10009; G06K 19/0723; H04W 4/80; H04W 52/0277; G06Q 10/087; G06Q 10/08

USPC ........................................................ 455/41.1
See application file for complete search history.

(56) References Cited

U.S. PATENT DOCUMENTS 6,195,006 B1   2/2001   Bowers et al.
9,501,675 B1   11/2016  Diorio et al.
(Continued)

FOREIGN PATENT DOCUMENTS

| EP | 1744267 A2 | 1/2007 |
|---|---|---|
| GB | 2455185 A | 6/2009 |
| WO | 2012131461 A1 | 10/2012 |

*Primary Examiner* — Eugene Yun

(57) ABSTRACT

In accordance with a first aspect of the present disclosure, a system is provided for verifying whether objects belong to a predefined set, the system comprising: a first radio frequency, RF, communication device comprised in or attached to a first object a second RF communication device comprised in or attached to a second object; an RF communication reader configured to perform a read operation; wherein a first portion of a valid response is provided in the first RF communication device and wherein a second portion of said valid response is provided in the second RF communication device; the system being configured to produce a positive verification result if the RF communication reader receives a sum of the first portion of the valid response and the second portion of the valid response. In accordance with a second aspect of the present disclosure, a corresponding method is conceived for verifying whether objects belong to a predefined set. In accordance with a third aspect of the present disclosure, a corresponding computer program is provided.

15 Claims, 4 Drawing Sheets

(56) References Cited

U.S. PATENT DOCUMENTS

| | | | |
|---|---|---|---|
| 2003/0126343 A1* | 7/2003 | Olarig | G06F 12/0607 |
| | | | 710/306 |
| 2006/0181420 A1 | 8/2006 | Ishii | |
| 2009/0002174 A1 | 1/2009 | Kukita et al. | |
| 2009/0102740 A1* | 4/2009 | Rofougaran | H01Q 1/38 |
| | | | 343/860 |
| 2009/0184802 A1 | 7/2009 | Park | |
| 2014/0009291 A1 | 1/2014 | Requist et al. | |
| 2014/0225715 A1 | 8/2014 | Moran | |
| 2014/0372259 A1* | 12/2014 | Elberbaum | H02J 7/00 |
| | | | 705/26.81 |
| 2018/0131593 A1* | 5/2018 | Jain | H04L 12/66 |

* cited by examiner

SYSTEM AND METHOD FOR VERIFYING WHETHER OBJECTS BELONG TO A PREDEFINED SET

CROSS-REFERENCE TO RELATED APPLICATIONS

This application claims priority under 35 U.S.C. § 119 to European Patent Application No. 18197932.9, filed on Oct. 1, 2018, the contents of which are incorporated by reference herein.

TECHNICAL FIELD

The present disclosure relates to a system for verifying whether objects belong to a predefined set. Furthermore, the present disclosure relates to a corresponding method for verifying whether objects belong to a predefined set, and to a computer program for carrying out or controlling said method.

BACKGROUND

Systems and methods of the kind set forth may be useful in the following context. In a store, it may be desirable to easily check whether certain objects belong to a given set. For instance, it may be desirable for store personnel to easily check whether a particular shoe belongs to a given pair of shoes. Such systems and methods may use stickers, stamps, seals, or physical bonding, to link objects into a single set or pair. It may be desirable to improve these systems and methods, such that they are easier to apply and more reliable.

SUMMARY

In accordance with a first aspect of the present disclosure, a system is provided for verifying whether objects belong to a predefined set, the system comprising: a first radio frequency, RF, communication device comprised in or attached to a first object; a second RF communication device comprised in or attached to a second object; an RF communication reader configured to perform a read operation; wherein a first portion of a valid response is provided in the first RF communication device and wherein a second portion of said valid response is provided in the second RF communication device; the system being configured to produce a positive verification result if the RF communication reader receives a sum of the first portion of the valid response and the second portion of the valid response.

In an embodiment, the first RF communication device and the second RF communication device are radio frequency identification (RFID) tags or near field communication (NFC) tags.

In an embodiment, the RF communication reader is a radio frequency identification (RFID) reader or a near field communication (NFC) reader.

In an embodiment, the first portion and the second portion are merged in-air while the RF communication reader communicates with the first and second RF communication device.

In an embodiment, the system comprises at least one further RF communication device comprised in or attached to a further object, wherein a further portion of the valid response is provided in the further RF communication device, and wherein the system is configured to produce a positive verification result if the RF communication reader receives a sum of the first portion of the valid response, the second portion of the valid response, and the further portion of the valid response.

In an embodiment, the system is configured to produce a negative verification result if the RF communication reader does not receive the sum of the first portion of the valid response and the second portion of the valid response.

In an embodiment, the system is configured to produce a negative verification result if the RF communication reader receives further data between the first portion of the valid response and the second portion of the valid response, or if the RF communication reader receives further data in addition to the sum of the first portion of the valid response and the second portion of the valid response.

In an embodiment, price-related data and/or stock-related data are stored in the first RF communication device and/or the second RF communication device.

In an embodiment, the RF communication reader is configured to provide power to the first RF communication device and the second RF communication device.

In accordance with a second aspect of the present disclosure, a method is conceived for verifying whether objects belong to a predefined set, the method comprising: providing a first portion of a valid response in a first radio frequency, RF, communication device, wherein the first RF communication device is comprised in or attached to a first object;
providing a second portion of a valid response in a second RF communication device, wherein the second RF communication device is comprised in or attached to a second object;
initiating, by an RF communication reader, a read operation; producing a positive verification result if the RF communication reader receives a sum of the first portion of the valid response and the second portion of the valid response.

In an embodiment, the first RF communication device and the second RF communication device are radio frequency identification (RFID) tags or near field communication (NFC) tags.

In an embodiment, the RF communication reader is a radio frequency identification (RFID) reader or a near field communication (NFC) reader.

In an embodiment, the first portion and the second portion are merged in-air while the RF communication reader communicates with the first and second RF communication device.

In accordance with a third aspect of the present disclosure, a computer program is provided, comprising executable instructions which, when executed, carry out or control a method of the kind set forth.

In an embodiment, a non-transitory computer-readable medium comprises a computer program of the kind set forth.

DESCRIPTION OF DRAWINGS

Embodiments will be described in more detail with reference to the appended drawings, in which.

DESCRIPTION OF EMBODIMENTS

As mentioned above, it may be desirable to easily check whether certain objects belong to a given set. For instance, it may be desirable for store personnel to easily check whether a particular shoe belongs to a given pair of shoes. Such systems and methods may use stickers, stamps, seals, or physical bonding, to link objects into a single set or pair. It may be desirable to improve these systems and methods, such that they are easier to apply and more reliable. More specifically, these methods may not be very dependable, e.g. because stickers and stamps can be exchanged between objects that do not belong to the same set or pair, and if the physical bond is broken then the objects cannot easily be linked to the set or pair, unless for example also a sticker is used. The latter is not very convenient. In addition, these methods typically rely on visual checks, which can be difficult to apply for people having visual limitations, such as reduced color and depth capabilities. Furthermore, these checks are not always atomic, i.e. they are not always performed on multiple objects at the exact same time to avoid tampering.

Figure 1:
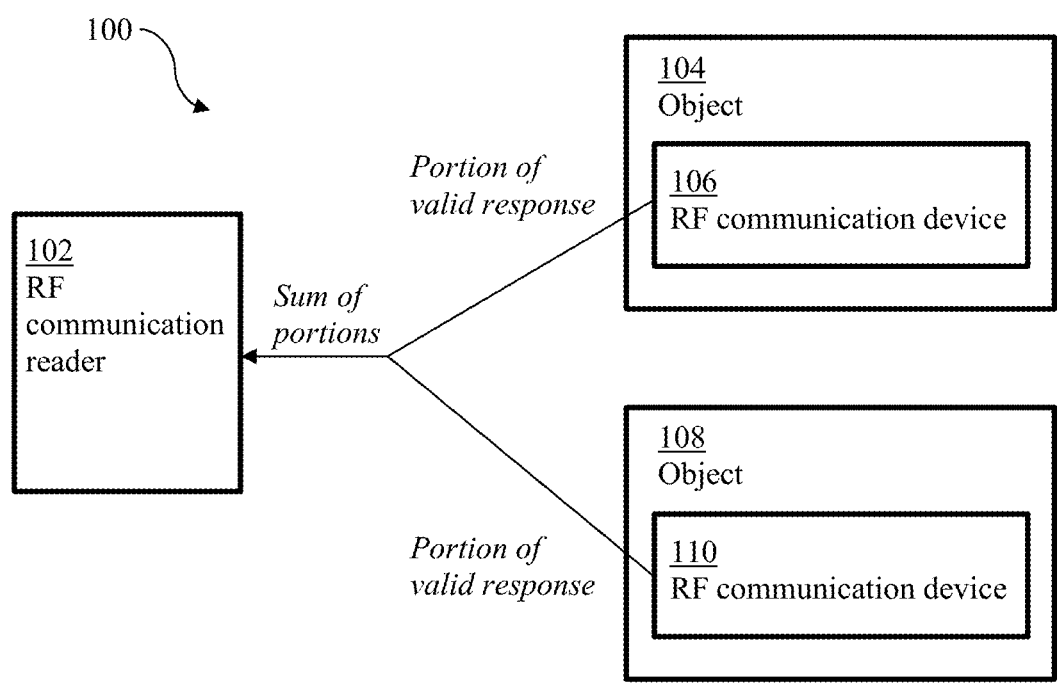
FIG. 1 shows an illustrative embodiment of a system for verifying whether objects belong to a predefined set.

FIG. 1 shows an illustrative embodiment of a system 100 for verifying whether objects belong to a predefined set. In accordance with the present disclosure, the system 100 comprises an RF communication reader 102 and first and second RF communication devices 106, 110 comprised in or attached to different, first and second objects 104, 108. The RF communication reader 102 is configured to perform a read operation. In particular, the RF communication reader 102 may be configured to initiate a read operation by sending a read command, to which the first and second RF communication device 106, 110 will respond if they are within the communication range of the reader 102. Furthermore, a first portion of a valid response is provided in the first RF communication device 106 and a second portion of said valid response is provided in the second RF communication device 108. The system 100 is configured to produce a positive verification result if the RF communication reader 102 receives a sum of the first portion of the valid response and the second portion of the valid response. In this way, it can easily be checked whether the first and second objects 104, 108 belong to a predefined set, because the valid response is indicative of this fact. In addition, the use of radio frequency (RF) communication facilitates the verification process.

It is noted that the term "valid response" should be interpreted broadly here, in the sense that it includes any information that may be indicative of the fact that the objects 104, 108 associated with the respective RF communication devices 106, 110 indeed belong together (i.e., indeed belong to the predefined set of objects). In a practical and effective implementation, the portions of the valid response are stored in non-volatile memories (not shown) of the RF communication devices 106, 110. It is noted that providing the RF communication devices 106, 110 with the respective portions of the valid response may be achieved by storing said portions into the RF communication devices 106, 110 before they are put into use. Alternatively, the RF communication devices 106, 110 may be configured to generate or construct the portions by means of a predefined algorithm, for example.

Furthermore, in a practical and effective implementation, the system may comprise a processing unit (not shown) that is coupled to, or embedded within, the RF communication reader 102. The processing unit may check if the summed portions of the valid response match a stored reference value, for example. The stored reference value represents the valid response, i.e. the response that is expected for a particular predefined set of objects.

Figure 2:
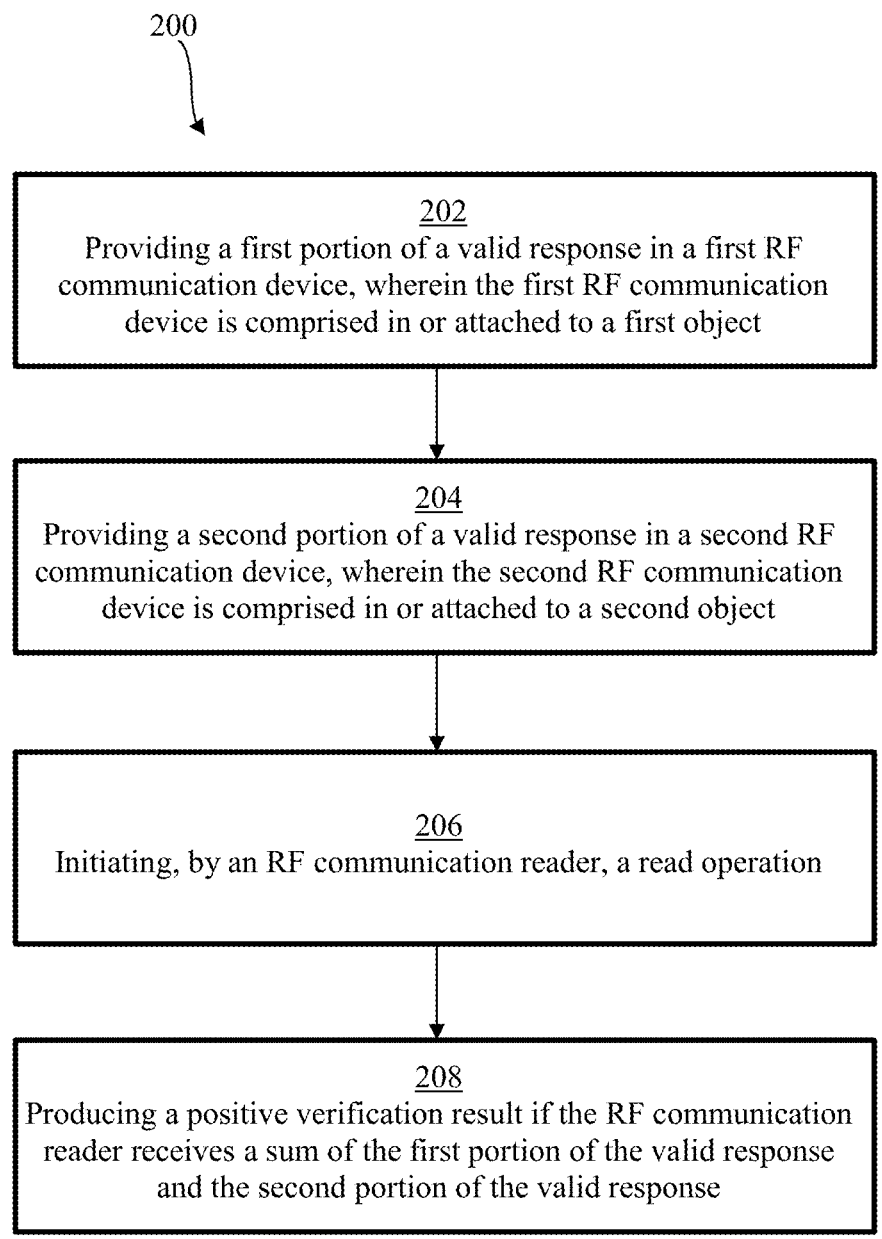
FIG. 2 shows an illustrative embodiment of a method for verifying whether objects belong to a predefined set.

FIG. 2 shows an illustrative embodiment of a corresponding method 200 for verifying whether objects belong to a predefined set. In accordance with the present disclosure, the method 200 comprises the following steps: at 202, providing a first portion of a valid response in a first RF communication device, wherein the first RF communication device is comprised in or attached to a first object; at 204, providing a second portion of a valid response in a second RF communication device, wherein the second RF communication device is comprised in or attached to a second object; at 206, initiating, by an RF communication reader, a read operation; and at 208, producing a positive verification result if the RF communication reader receives a sum of the first portion of the valid response and the second portion of the valid response. As mentioned above, in this way, it can easily be checked whether the first and second objects belong to a predefined set: the valid response is indicative of this fact. In addition, the use of radio frequency (RF) communication facilitates the verification process.

In an embodiment, the first and second RF communication devices are radio frequency identification (RFID) tags or near field communication (NFC) tags. Radio frequency identification (RFID) uses electromagnetic fields to automatically identify and track tags attached to objects. The tags contain electronically stored data. Passive tags collect energy from a nearby RFID reader's interrogating radio waves. Active tags have a local power source (such as a battery) and may operate hundreds of meters from the RFID reader. Near field communication (NFC) refers to a set of communication protocols that enable two electronic devices, one of which is often a portable device such as a smartphone, to establish communication by bringing them within proximity of each other. The communication range of NFC is typically in the order of 10 centimeters or less, but this range can be extended. Accordingly, in an embodiment, the RF communication reader is an RFID reader or an NFC reader. By using RFID or NFC, the presently disclosed verification system and method may be simplified: the use of RFID or NFC tags is simple and user friendly, and the tags can be read out easily without using specialized equipment. Furthermore, the tags can be passive tags, which results in a cost-effective yet reliable solution. Accordingly, in an embodiment, the RF communication reader is configured to provide power to the first RF communication device and the second RF communication device. Thus, the first and second RF communication devices can be powered by the field, and do not need to be equipped with a power source. As said, this results in a cost-effective yet reliable solution.

Thus, an RFID tag or NFC tag may be added to each object in a set or pair. Then, for example when objects are purchased or checked out, it can be checked whether these objects match with each other. RFID and NFC have the advantage of enabling simultaneous communication. This means that a reader may observe, during a single communication session, a response that is constructed from unique contributions by each of the tags in the set or pair. Furthermore, only matching tags may be able to construct or contribute to a correct communication, to make them appear as a single valid tag. In other words, if a tag is missing or a tag is added then it may be impossible to construct correct communication. The reader may transmit to all tags and provide all tags with power (by the field). Furthermore, the reader may synchronize the tags such that their communication is received by the reader in the same way as a correct communication from a single tag. Using an analogy, the valid response is like a chromosome built of two or more strings of DNA that complement each other. The chromosome is only recognized as such and as the one expected if the DNA strings are supplied at the right moment in time with synchronized DNA elements to ensure they "zip" together into the chromosome. Expanding on this analogy, it is assumed that the reader works on chromosomes and that the multiple tags together construct it (if they match) such that the reader only sees valid chromosomes.

The use of RFID or NFC may also have the following advantages. The tags may be passive, i.e. there may be no need for batteries or other means to store energy in the tags. Furthermore, additional checks can be performed after a purchase or use because the required equipment is off-the-shelf and widely available, e.g. through NFC support in mobile phones. General-purpose tags comprised in or attached to the objects can contain data to uniquely identify the objects, such that they can dependably be identified as belonging or not belonging to a single unique set or pair. Furthermore, a tag can A) include price- and stock-related data to settle a transaction at purchase, or managed use/ consumption, or B) an existing NFC tag can be extended with the data required to uniquely identify the objects such that they can dependably be identified as belonging or not belonging to a single unique set or pair. It is noted that the presently disclosed system and method are not limited to RFID or NFC, i.e. also other extended or long-range communication methods can be deployed. By embedding the tags in the objects removal, interchange, damage and destruction can be avoided, thereby achieving an improved tamper resistance.

Figure 3:
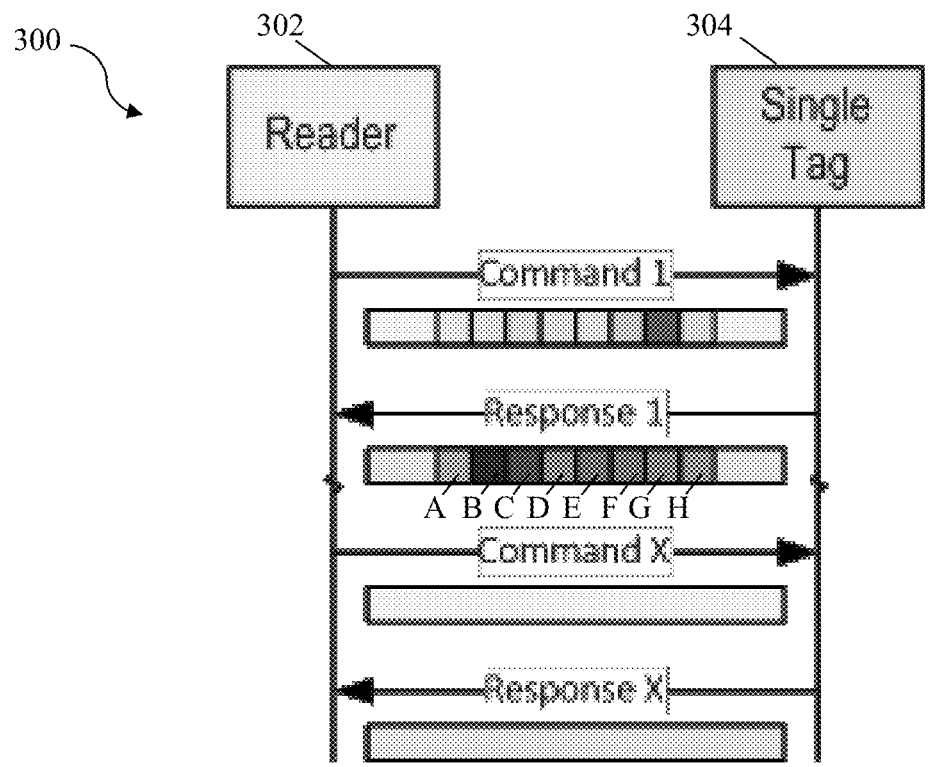
FIG. 3 shows an example of an RF communication system.

FIG. 3 shows an example of an RF communication system 300. The system 300 comprises an RF communication reader 302 and an RF tag 304, for example an RFID tag or an NFC tag. In operation, the RF communication reader 302 reads data from the RF tag 304. It is noted that, in the case of RFID, the reader 302 is sometimes referred to as an "interrogator". The RF communication reader 302 may transmit commands to the tag 304, and the tag 304 may reply with a response message to the reader 302. The response message consists of a plurality of portions A, B, C, D, E, F, G, H.

Figure 4:
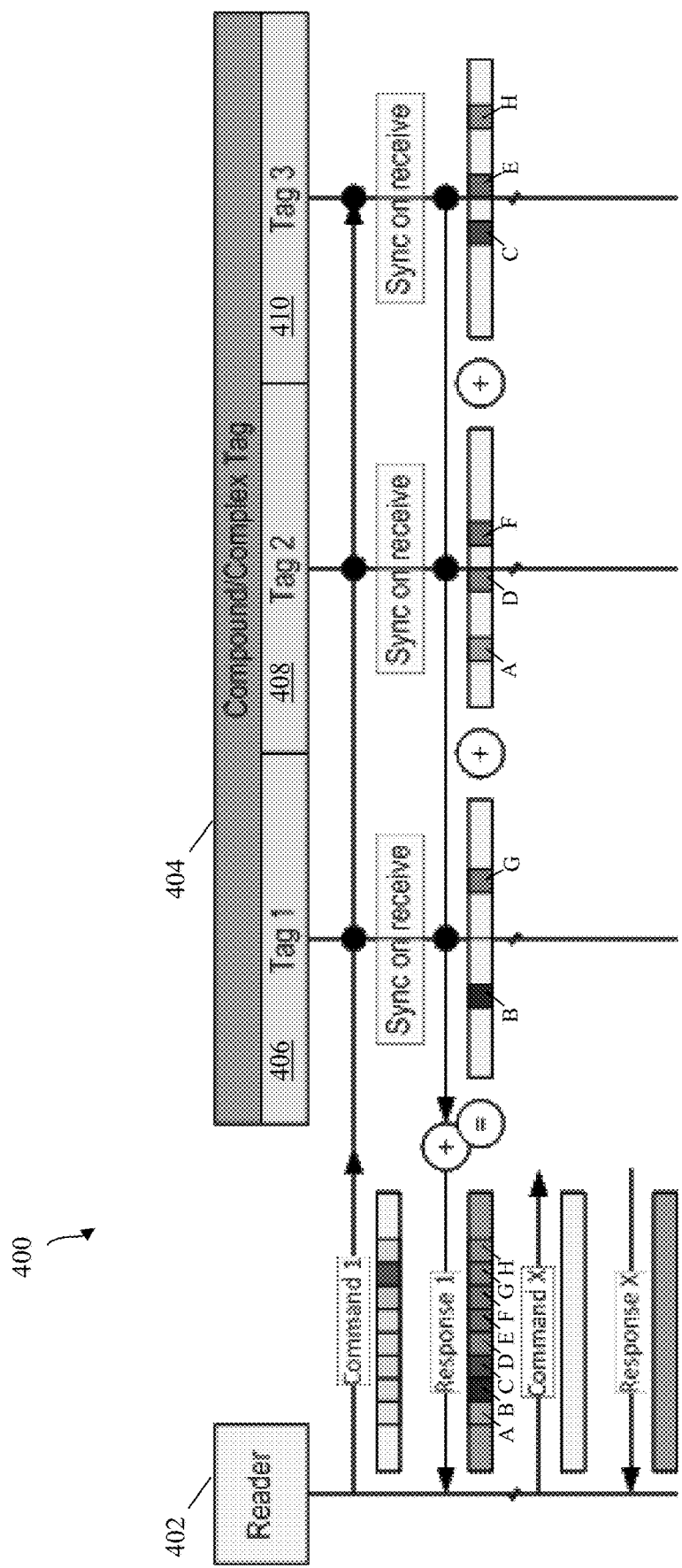
FIG. 4 shows another illustrative embodiment of a system for verifying whether objects belong to a predefined set.

FIG. 4 shows another illustrative embodiment of a system 400 for verifying whether objects belong to a predefined set. The system 400 comprises an RF communication reader 402 and a compound or complex tag 404. The compound or complex tag 404 can be regarded as a virtual tag, formed by a plurality of physical tags 406, 408, 410. More specifically, by electrically in-air summing the responses of the individual tags it is possible to construct valid communication as if the reader were talking to a single tag. In other words, a single communication data stream may be constructed from multiple interleaved and air-gapped transmissions by in-air addition, as if the source were a single antenna. These transmissions may be regarded as snippets of a valid response; a complete valid response may be constructed in-air using these snippets. More specifically, as shown in FIG. 4, a first tag 406 provides portions B and G of a valid response to a first read command, a second tag 408 provides portions A, D and F of said valid response, and a third tag 410 provides portions C, E and H, of said valid response.

In an embodiment, the system comprises at least one further RF communication device comprised in or attached to a further object, wherein a further portion of the valid response is provided in the further RF communication device, and wherein the system is configured to produce a positive verification result if the RF communication reader receives a sum of the first portion of the valid response, the second portion of the valid response, and the further portion of the valid response. In this way, it can easily be verified whether objects belong to larger predefined sets, i.e. sets with more than two objects. Furthermore, in an embodiment, the system is further configured to produce a negative verification result if the RF communication reader does not receive the sum of the first portion of the valid response and the second portion of the valid response. In this way, a user may for example be warned explicitly that at least one object of the predefined set is not present. Furthermore, in an embodiment, the system is configured to produce a negative verification result if the RF communication reader receives further data between the first portion of the valid response and the second portion of the valid response, or if the RF communication reader receives further data in addition to the sum of the first portion of the valid response and the second portion of the valid response. In this way, it can be ensured that only those objects that belong to the predefined set are present. This may be useful for avoiding that wrong or non-matching objects are inadvertently sold to a customer, for example.

The presently disclosed system and method can be applied to various kinds of objects. For example, these objects may include: shoes, socks, gloves, tires, keys, glasses, medical prostheses, multi-component medicines, and multi-component glues. It is noted that this list of objects is non-exhaustive.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, nonvolatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 system for verifying whether objects belong to a predefined set
102 RF communication reader
104 object
106 RF communication device
108 object
110 RF communication device
200 method for verifying whether objects belong to a predefined set
202 providing a first portion of a valid response in a first RF communication device, wherein the first RF communication device is comprised in or attached to a first object
204 providing a second portion of a valid response in a second RF communication device, wherein the second RF communication device is comprised in or attached to a second object
206 initiating, by a RF communication reader, a read operation
208 producing a positive verification result if the RF communication reader receives a sum of the first portion of the valid response and the second portion of the valid response
300 RF communication system
302 reader
304 single tag
A portion of response message
B portion of response message
C portion of response message
D portion of response message
E portion of response message
F portion of response message
G portion of response message
H portion of response message
400 system for verifying whether objects belong to a predefined set
402 reader
404 compound/complex tag
406 first tag
408 second tag
410 third tag

The invention claimed is:

1. A system for verifying whether objects belong to a predefined set, the system comprising:
   a first radio frequency, RF, communication device comprised in or attached to a first object;
   a second RF communication device comprised in or attached to a second object;
   an RF communication reader configured to initiate a read operation by sending a read command to the first and second RF communication devices;
   wherein a first portion of a single valid response to the read operation is provided in a first transmission from the first RF communication device and wherein a second portion of said single valid response is provided in a second transmission from the second RF communication device, and wherein the single valid response is constructed from multiple interleaved portions of transmissions comprising the first and second portions;
   the system being configured to produce a positive verification result if the RF communication reader receives a sum of the multiple interleaved portions.

2. The system of claim 1, wherein the first RF communication device and the second RF communication device are radio frequency identification, RFID, tags or near field communication, NFC, tags.

3. The system of claim 1, wherein the RF communication reader is a radio frequency identification, RFID, reader or a near field communication, NFC, reader.

4. The system of claim 1, wherein the first portion and the second portion are merged in-air while the RF communication reader communicates with the first and second RF communication device.

5. The system of claim 1, comprising at least one further RF communication device comprised in or attached to a further object, wherein a further portion of the single valid response is provided in the further RF communication device, and wherein the system is configured to produce positive verification result if the RF communication reader receives a sum of the first portion of the single valid response, the second portion of the single valid response, and the further portion of the single valid response.

6. The system of claim 1, wherein the system is configured to produce a negative verification result if the RF communication reader does not receive the sum of the first portion of the single valid response and the second portion of the single valid response.

7. The system of claim 1, wherein the system is configured to produce a negative verification result if the RF communication reader receives further data between the first portion of the single valid response and the second portion of the single valid response, or if the RF communication reader receives further data in addition to the sum of the first portion of the single valid response and the second portion of the single valid response.

8. The system of claim 1, wherein price-related data and/or stock-related data are stored in the first RF communication device and/or the second RF communication device.

9. The system of claim 1, wherein the RF communication reader is configured to provide power to the first RF communication device and the second RF communication device.

10. A method for verifying whether objects belong to a predefined set, the method comprising:

initiating, by an RF communication reader, a read operation by sending a read command to a plurality of radio frequency (RF) communication devices comprising first and second RF communication devices;

providing a first portion of a single valid response to the read operation in a transmission from the first RF communication device, wherein the first RF communication device is comprised in or attached to a first object;

providing a second portion of the single valid response to the read operation in the second RF communication device, wherein the second RF communication device is comprised in or attached to a second object, and wherein the single valid response is constructed from multiple interleaved portions of the transmissions comprising the first and second portions; and producing a positive verification result if the RF communication reader receives a sum of the multiple interleaved portions.

11. The method of claim 10, wherein the first RF communication device and the second RF communication device are radio frequency identification, RFID, tags or near field communication, NFC, tags.

12. The method of claim 10, wherein the RF communication reader is a radio frequency identification, RFID, reader or a near field communication, NFC, reader.

13. The method of claim 10, wherein the first portion and the second portion are merged in-air while the RF communication reader communicates with the first and second RF communication device.

14. A computer program comprising executable instructions which, when executed, carry out or control the method of claim 10.

15. A non-transitory computer-readable medium comprising the computer program of claim 14.

* * * * *